United States Patent [19]

Lyon

[11] Patent Number: 5,964,492
[45] Date of Patent: Oct. 12, 1999

[54] STOWAGE RECEPTACLE INSTALLATION FOR A PICK-UP TRUCK BED

[76] Inventor: Gordon Lyon, 1293 Brambles, Waterford, Mich. 48328

[21] Appl. No.: 08/614,844

[22] Filed: Mar. 8, 1996

Related U.S. Application Data

[63] Continuation of application No. 08/287,962, Aug. 9, 1994, abandoned.

[51] Int. Cl.[6] ........................................... B60R 9/06
[52] U.S. Cl. ........................................... 296/37.6; 224/404
[58] Field of Search ................................. 296/37.1, 37.6, 296/26; 224/400–404; 312/270.3; 108/44

[56] References Cited

U.S. PATENT DOCUMENTS

| 977,349 | 11/1910 | Wagner | 312/270.3 |
|---|---|---|---|
| 1,279,635 | 9/1918 | Belvel | 224/401 X |
| 1,815,656 | 7/1931 | McMurray | 296/37.1 |
| 2,284,419 | 5/1942 | Greig | 296/26 |
| 2,549,018 | 4/1951 | Sarlo | 296/26 |
| 2,784,027 | 3/1957 | Temp | 296/26 X |
| 3,028,025 | 4/1962 | White | 224/401 X |
| 3,534,892 | 10/1970 | Truelove, Sr. | 224/401 X |
| 4,573,731 | 3/1986 | Knaack | 296/37.6 |
| 4,718,583 | 1/1988 | Mullican | 296/37.6 X |
| 4,733,898 | 3/1988 | Williams | 296/37.6 |
| 4,752,095 | 6/1988 | Brady | 296/37.6 |
| 4,824,158 | 4/1989 | Peters et al. | 108/44 X |
| 4,830,242 | 5/1989 | Painter | 296/37.6 X |
| 5,064,335 | 11/1991 | Bergeron et al. | 224/403 X |
| 5,088,636 | 2/1992 | Barajas | 296/37.6 |
| 5,456,511 | 10/1995 | Webber | 296/26 |

FOREIGN PATENT DOCUMENTS 309692   4/1989   European Pat. Off. ............. 296/37.6

*Primary Examiner*—Dennis H. Pedder
*Attorney, Agent, or Firm*—John R. Benefiel

[57] ABSTRACT

An enclosed storage receptacle for a pick-up truck bed is mounted at the rear of the bed to be movable out over the lowered tailgate. A locking system secures a cover and also the receptacle to a pair of detachably mounted side rails.

5 Claims, 2 Drawing Sheets

STOWAGE RECEPTACLE INSTALLATION FOR A PICK-UP TRUCK BED

"This is a continuation of application(s) Ser. No. 08/287,962 filed on Aug. 9, 1994", now abandoned.

BACKGROUND OF THE INVENTION

This invention concerns stowage receptacles for the bed of a pick-up truck.

The increased use of light trucks as general purpose vehicles has increased the need for conveniently accessible and secure storage space in the normally open bed of pick ups.

The large unconfined space within the bed is not conveniently usable for such cargo as groceries or shopping packages, particularly when a cap is installed over the bed.

Much of the effort at providing conveniently accessible storage space has been for tools and other trade equipment. See for example, U.S. Pat. No. 4,966,401, issued on Oct. 30, 1990, for an "Extension Glide System for Mounting Truck Storage Box"; U.S. Pat. No. 5,121,959, issued on Jun. 16, 1992, for a "Slide Mount for Pick-up Truck Tool boxes"; U.S. Pat. No. 5,037,153 issued on Aug. 6, 1991, for a "Movable Load Support Assembly"; and U.S. Pat. No. 5,088,636 issued on Feb. 18, 1992, for a "Rolling Tool Box".

These patents show a tool box mounted in truck bed to be able to be rolled to the rear of the bed. These arrangements are not conveniently usable for stowing groceries or similar miscellaneous cargo as the box is normally at the forward end of the bed and must be released and rolled to the rear. If the tailgate is lowered, the box is still not easily reachable even when at the rear of the bed.

A cap is not usable with boxes rolled along rails mounted atop the sides of the bed. Also, tonneau covers held with snaps cannot be used with such receptacles.

U.S. Pat. No. 4,824,158 issued on Apr. 25, 1989, for a "Combination Access Box and Bed Liner for Vehicles", shows a bed liner which may be rolled out past the lowered tailgate. This does not provide an enclosed receptacle which can confine grocery bags and the like.

U.S. Pat. 4,946,215 issued on Aug. 7, 1990, for a "Storage Device for a Pick-up Truck Bed" shows a covered receptacle with a cover which can be locked, the receptacle fixed at the rear of the bed. See also U.S. Pat. No. 5,083,829 issued on Jan. 28, 1992, for a "Pick-up Truck Storage Truck and Air Foil" and U.S. Pat. No. 4,828,312 issued on May 9, 1989 for a "Collapsible Security Storage Apparatus for Truck Beds".

These receptacles are inconvenient in that one must reach over the opened tailgate to gain access to the interior of the receptacle.

Where a cap or tonneau cover is installed, there is a lack of overhead clearance for opening lids and for obtaining easy access to the interior of the receptacle.

Security of such a storage receptacle is an important concern, to prevent unauthorized opening or removal of the receptacle. It is also desirable to allow convenient complete removal of the receptacle and any supporting structure so that the pick-up bed can be restored to its completely unobstructed state for normal truck use.

It is an object of the invention to provide a covered storage receptacle for pick-up truck beds which is easily accessible with a cap or tonneau cover installed, and which allows easy removal to restore the bed to an unobstructed state.

SUMMARY OF THE INVENTION

The present invention comprises an enclosed receptacle of a relatively short fore and aft dimension, which is mounted to a pair of rails at the rear of the bed of a pick-up. The mounting allows a rearward rolling of the receptacle to a position extended over the lowered tailgate of the pick-up such as to allow easy access to the contents of the receptacle when a security cover is opened.

The rolled out position allows clearance for opening the cover when a cap or tonneau cover is present.

The receptacle is instantly removable to clear the bed for receiving cargo.

The support rails are detachably mounted to the pick-up bed such as to allow complete removal of the receptacle and the rails to provide clear, unobstructed condition of the pick-up bed.

The cover of the receptacle is lockable in a closed position by means of a pair of locking rods which are extended by the cover handle such as to pass through sidewalls of the receptacle and also into aligned holes in a respective side rail to secure the receptacle cover in the closed condition and to prevent removal of receptacle from the side rails.

DETAILED DESCRIPTION

In the following detailed description, certain specific terminology will be employed for the sake of clarity and a particular embodiment described in accordance with the requirements of 35 USC 112, but it is to be understood that the same is not intended to be limiting, inasmuch as the invention is capable of taking many forms and variations within the scope of the appended claims.

Figure 1:
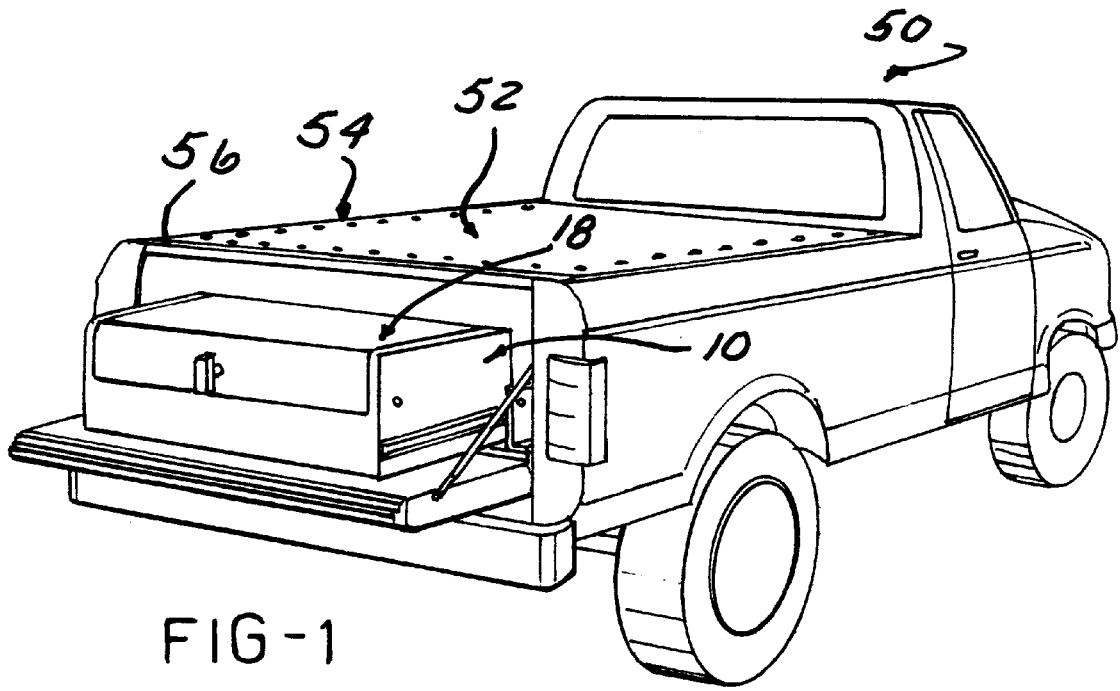
FIG. 1 is a rear perspective view of a pick-up truck having a tonneau cover installed, with a receptacle according to the invention shown rolled out over the tailgate.

Referring to the drawings and particularly FIG. 1, a pick-up truck 50 is shown having a tonneau cover 52 installed over the cargo section 54. Such installations include a frame 56 extending across the tailgate opening such as to create an overhead obstruction. The receptacle 10 according to the invention is shown rolled out to be substantially clear of the frame 56 and allow opening of a hinged cover 18.

Figure 2:
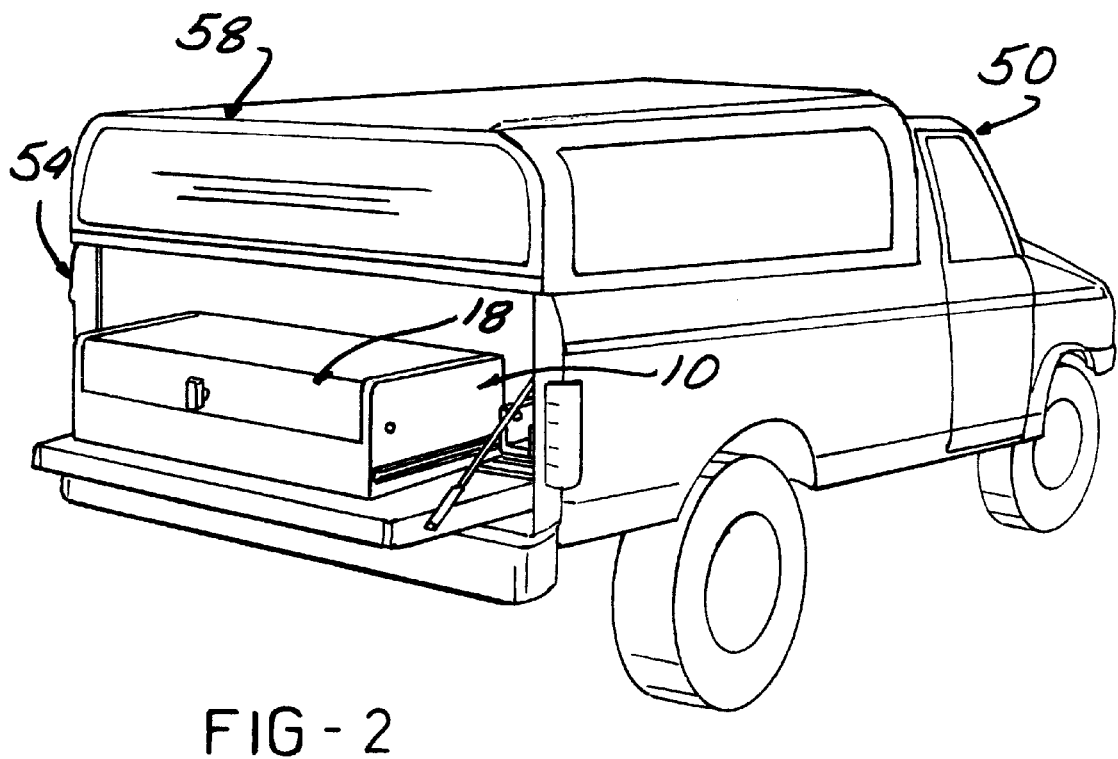
FIG. 2 is a rear perspective view of a pick-up truck having a cap installed, with a receptacle according to the invention shown rolled out over the tailgate.

FIG. 2 shows the pick-up truck 50 with a cap 58 installed over the cargo section 54. The receptacle 10 again can be rolled out to the position shown to substantially clear the cap 58.

Figure 3:
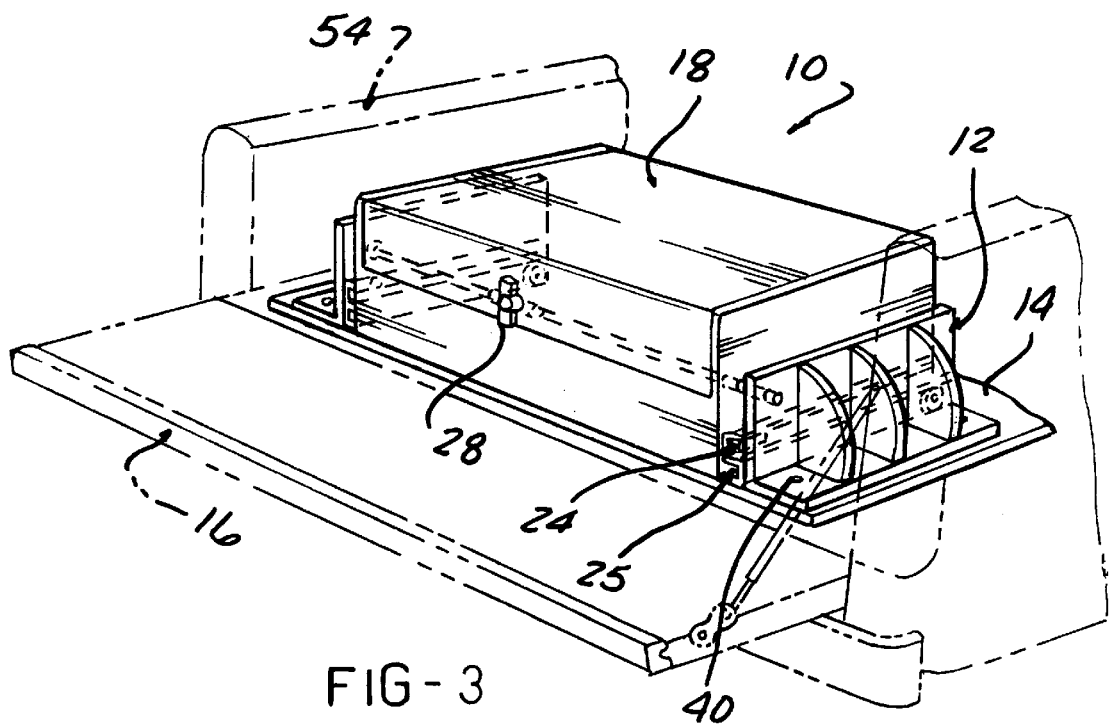
FIG. 3 is a perspective view of the receptacle installation according to the present invention with a phantom depiction of the rear portions of a pick-up truck on which the receptacle installation is installed with the receptacle shown in the cover closed and retracted condition disposed completely within the bed of the pick-up truck.
Figure 4:
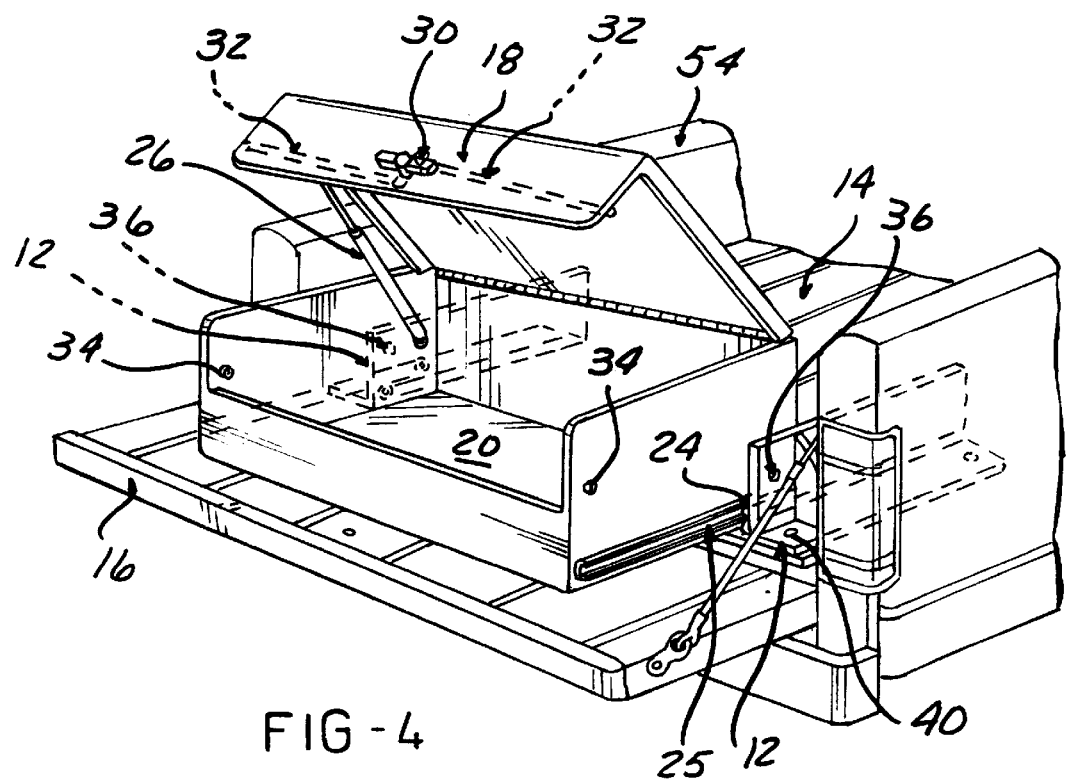
FIG. 4 is a perspective view of the receptacle installation showing in fragmentary form the rear bed portions of the pick-up truck showing the receptacle rolled out over the tailgate and with the cover thereof opened.

FIGS. 3 and 4 show further details of the receptacle installation according to the present invention, which includes the covered box-like receptacle 10 which is mounted to a pair of spaced apart support rails 12, which are detachably mounted to the deck 14 of the pick-up cargo section bed at the rearmost location adjacent the tailgate 16.

So-called trick nuts can be used to detachably mount the rails 12 by threaded fasteners 40.

The receptacle 10 is of a relatively short fore and aft dimension, i.e, 24 inches, so as to define a confined region at the rear of the truck bed.

The receptacle 10 includes the cover 18 which is hinged to the rearwall of the receptacle 10 such as to be able to be swung up to open as shown in FIG. 2 and thereby enable access to the interior 20 of the enclosure defined by the enclosed inner space defined by the receptacle 10.

The overall depth of the receptacle 10 is preferably on the order of 13 inches in order to accommodate bags of groceries and similar items.

The mounting of the receptacle 10 on the support rails 12 allows rolling or sliding movement of the enclosure 10 to an extended rear position atop the pick-up tailgate 16 as shown in FIG. 2. Such mounting may be provided by channel and roller mounting combinations 25 on each side, which are commercially available and widely used for such applications as drawer supports, etc. Suitable mounts are available from Knape & Vogt Mfg. of Grand Rapids, Mich., models 8505 and 8405. These mounts include upper and lower channels with mating rollers each mounted to a side rail and a receptacle sidewall, respectively.

A pivoting stop 24 is provided to prevent the escape of the receptacle 10 from the roller mount system when the receptacle 10 is fully rolled out to the rear extended position of FIG. 2.

A counterweighting air cylinder 26 may be provided or alternatively spring hinges used to hold the lid 18 in the open position until manually lowered to close the same.

A locking system is also provided including a pivotable, handle 28 located at the front of the cover 18 which drives a rotary lever disc 30 to which is attached oppositely directed locking rods 32 which extend to the sides of the front portion of the cover 18 with the disc 30 rotated to the vertical position. The rods 32 are laterally advanced when the handle 28 is rotated, as shown in FIG. 1. This advance causes each of the locking rods 32 to pass through a respective hole 34 in each sidewall of the receptacle 10 and holes 36 in each of the mounting side rails 12.

The side rails 12 may also be removed by moving the threaded fasteners 40 from the deck 14 on the bed of the pick-up truck.

Accordingly, it can be appreciated that the receptacle installation provides a very conveniently accessible storage space which is located at the rear of the pick-up. The roller feature allows convenient access with the pick-up tailgate 16 lowered. The entire installation is relatively easily removed for conventional use of the truck.

The installation is compatible with the use of a truck cap inasmuch as the side rails 12 are inboard from the adjacent sidewall of the pick-up bed, which remain unobstructed.

The receptacle is of a relatively low height allowing installation of a tonneau cover over the bed.

I claim:

1. A storage receptacle installation for a covered pick-up truck bed comprising:

a pair of spaced apart side-by-side mounting rails;

means detachably mounting said mounting rails on the bed of said pick-up truck in a rear portion adjacent a tailgate of said truck;

said pair of mounting rails of a limited length so as to extend only over a minor portion of the length of said truck bed adjacent said tailgate with most of the length of said truck bed clear of said mounting rails;

an enclosed receptacle including a hinged cover closeable onto said receptacle, and locking means for securing said cover closed on said receptacle;

means removably mounting said enclosed receptacle to said pair of mounting rails for movement along said pair of mounting rails so as to be movable thereon only between a retracted position lying entirely within said pick-up truck bed immediately adjacent to said tailgate and within said minor portion thereof occupied by said pair of mounting rails and a rear extended position to the rear of said truck bed and overlying said tailgate when lowered to extend horizontally to the rear of said pick-up truck bed;

said enclosed receptacle of a limited fore and aft dimension so as to occupy only said rear portion of said pick-up truck bed at the rear thereof when in said retracted position;

said mounting rails exposed when said enclosed receptacle is removed therefrom to enable loading items onto said truck bed between said mounting rails and also enabling ready access to said mounting rails for removal from said truck bed.

2. The installation according to claim 1 wherein said receptacle comprises a lower box-like enclosure portion having sidewalls and said hinged cover is mounted to a rear side of said lower portion of said receptacle to be able to be swung up and allow access to said lower portion of said enclosure.

3. The installation according to claim 2 wherein said locking means includes a rotatable locking handle on said cover coupled to a locking disc and a pair of locking rods connected to said disc and oppositely extending toward a respective mounting rail and wherein opposite sidewalls of said receptacle and said mounting rails each have a hole aligned with a respective rod with said cover closed and said receptacle in said retracted position, and adapted to receive the same upon extension thereof by rotation of said handle and disc, thereby simultaneously locking said cover in the closed position and said receptacle in said retracted position.

4. The installation according to claim 1 wherein said fore and aft dimension of said receptacle and said mounting rails is on the order of 24 inches, and is of a height on the order of 13 inches to thereby accommodate grocery bags and the like.

5. The installation according to claim 2 further including a counterweight means for holding said cover in an opened condition.

* * * * *